(12) United States Patent
Di Lullo et al.

(10) Patent No.: US 9,188,270 B2
(45) Date of Patent: Nov. 17, 2015

(54) MONITORING AND ANALYSIS METHOD OF THE CONDITIONS OF A PIPELINE

(75) Inventors: Alberto Giulio Di Lullo, Tribiano (IT); Alessia Poggio, Senigallia (IT); Eliana De Marchi, Salzano (IT)

(73) Assignee: ENI S.P.A., Rome (IT)

( * ) Notice: Subject to any disclaimer, the term of this patent is extended or adjusted under 35 U.S.C. 154(b) by 43 days.

(21) Appl. No.: 13/809,998

(22) PCT Filed: Jul. 13, 2011

(86) PCT No.: PCT/EP2011/061926
§ 371 (c)(1),
(2), (4) Date: Jul. 8, 2013

(87) PCT Pub. No.: WO2012/010474
PCT Pub. Date: Jan. 26, 2012

(65) Prior Publication Data
US 2013/0291635 A1 Nov. 7, 2013

(30) Foreign Application Priority Data
Jul. 20, 2010 (IT) .............................. MI2010A1340

(51) Int. Cl.
| | |
|---|---|
| *G01M 3/14* | (2006.01) |
| *G01M 3/08* | (2006.01) |
| *F16L 101/30* | (2006.01) |
| *F16L 55/40* | (2006.01) |
| *G01M 3/24* | (2006.01) |
| *G01M 3/28* | (2006.01) |

(52) U.S. Cl.
CPC ................ *F16L 55/40* (2013.01); *G01M 3/246* (2013.01); *G01M 3/2823* (2013.01); *F16L 2101/30* (2013.01)

(58) Field of Classification Search
CPC ... F16L 2101/00; F16L 2101/30; F16L 55/26; F16L 55/265
USPC ........... 73/40, 40.5 A, 40.5 R, 49.1, 488, 700, 73/865.8
See application file for complete search history.

(56) References Cited

U.S. PATENT DOCUMENTS

| | | | | |
|---|---|---|---|---|
| 5,659,142 | A * | 8/1997 | Lima et al. ................... | 73/865.8 |
| 6,644,356 | B1 * | 11/2003 | Connor et al. ................. | 138/98 |
| 2008/0202248 | A1 * | 8/2008 | Tojo et al. ...................... | 73/721 |
| 2010/0064775 | A1 * | 3/2010 | Ben-Mansour ............ | 73/40.5 A |

FOREIGN PATENT DOCUMENTS

| | | |
|---|---|---|
| EP | 1172155 A2 | 1/2002 |
| GB | 2295876 A | 6/1996 |
| WO | 2006081671 A1 | 8/2006 |

* cited by examiner

*Primary Examiner* — Eric S McCall
*Assistant Examiner* — Anthony W Megna Fuentes
(74) *Attorney, Agent, or Firm* — Tarolli, Sundheim, Covell & Tummino LLP

(57) ABSTRACT

Monitoring and analysis method of the conditions of a pipeline, comprising: providing an inspection device (1) in expanded polymeric or elastomeric material comprising at least one measurement instrument (2, 3), said measurement instrument including at least one casing and at least one sensor; introducing said inspection device into the pipeline (5); recovering said inspection device; wherein said casing is made of polymeric or elastomeric material, having a density, measured according to the regulation ASTM D3574, higher than or equal to 30 kg/m3, preferably ranging from 700 to 2,000 kg/m3. Said method allows the continuous registration and storage of useful parameters for revealing defects and/or anomalies inside the pipeline (5) that transports gas and/or liquids, as well as possible variations in the internal diameter of the same.

20 Claims, 4 Drawing Sheets

Figure 1:
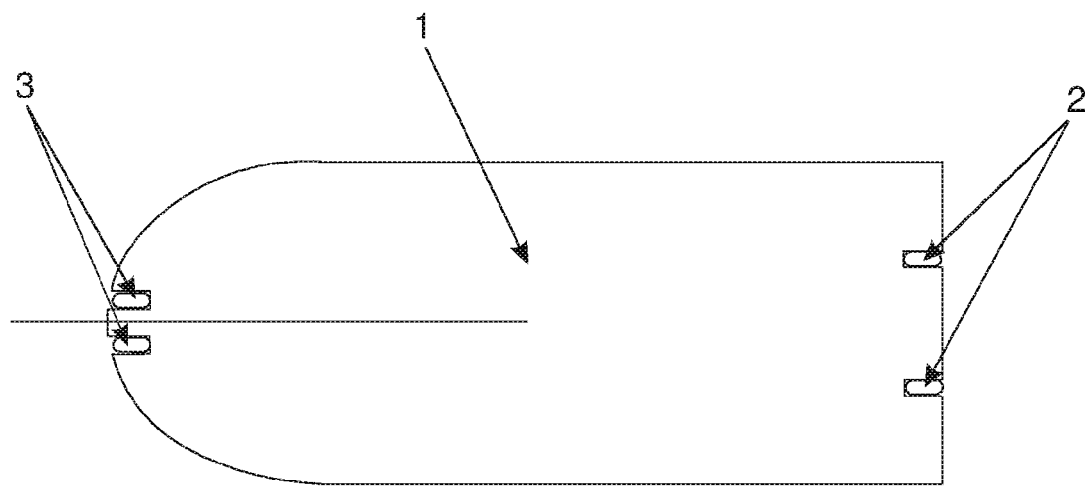

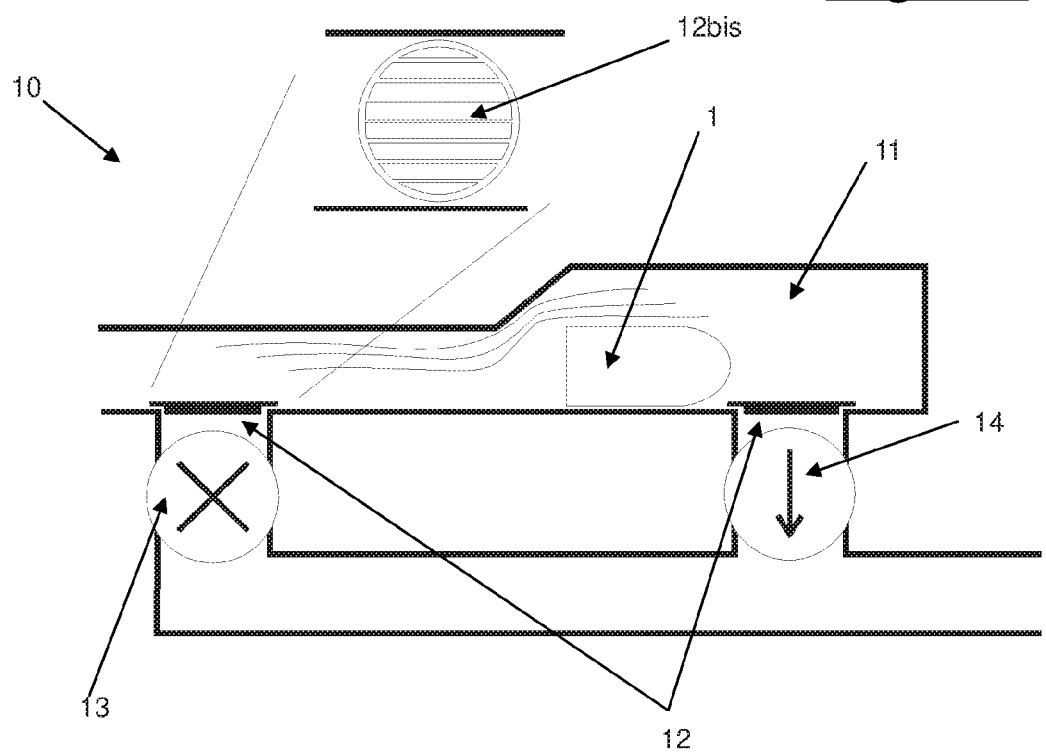
Fig.6.1
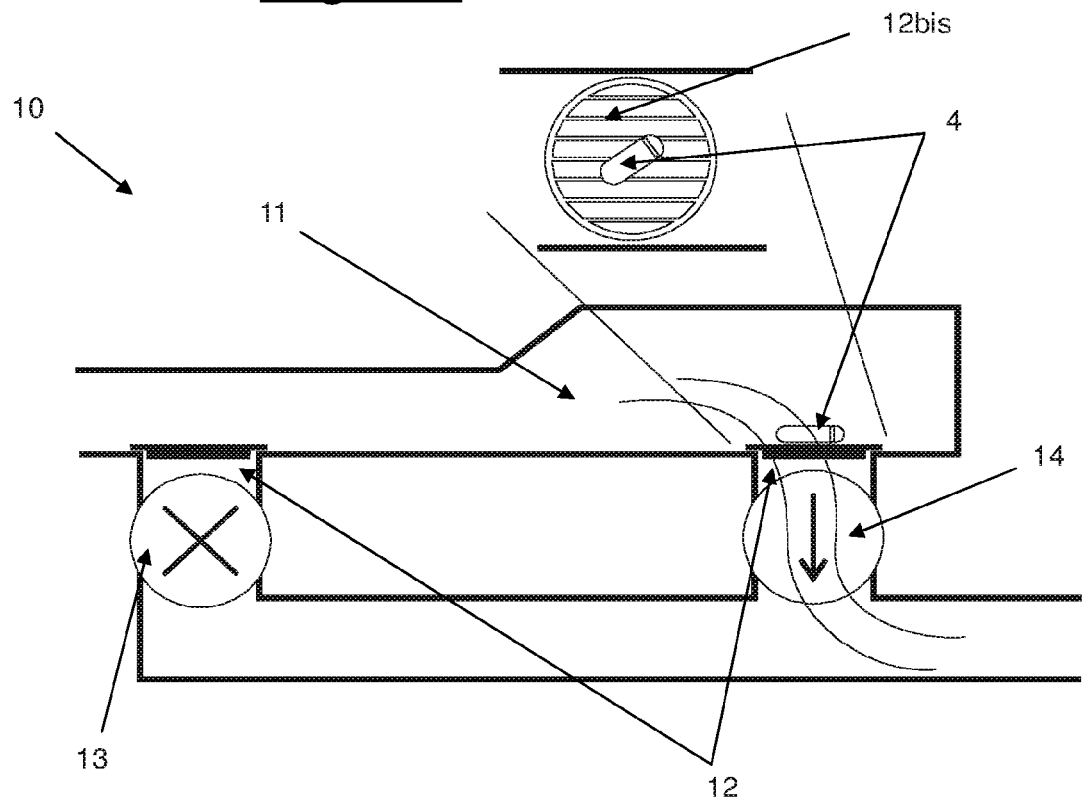
Fig.6.2

MONITORING AND ANALYSIS METHOD OF THE CONDITIONS OF A PIPELINE

RELATED APPLICATION

This application is a National Phase filing of PCT/EP2011/061926, filed Jul. 13, 2011, which claims priority from Italian Application No. MI2010A001340, filed Jul. 20, 2010, the subject matter of which are incorporated herein by reference in their entirety.

The present invention relates to a monitoring and analysis method of the conditions of a pipeline.

More specifically, the present invention relates to a monitoring and analysis method of the conditions of a pipeline with the use of an inspection device of expanded polymeric or elastomeric material comprising at least one measurement instrument including at least one casing and at least one sensor, said casing being of polymeric or elastomeric material.

The invention also relates to an inspection device which effects this method.

Inside pipelines destined for the transportation of gas and/or liquids, such as, for example, methane, oil, naphtha, solid deposits can be formed which reduce the pipeline section, causing flow problems of said gas and/or liquids.

The formation of said solid deposits, moreover, can cause an increase in the pressure in the pipelines or even obstructions of the same.

It is also possible that fissures, leaks and/or cracks are formed in the pipeline, which can cause leakages, and which, particularly in the case of the underground pipes, more specifically in the case of underwater pipes, are difficult to be traced and positioned along said pipelines.

The internal inspection of pipelines, moreover, represents a fundamental aspect for being able to effect maintenance interventions in safety, for re-using existing pipelines and maintaining adequate and efficient operating and transportation conditions.

It is known that the internal inspection of pipelines can be effected, for example, with instruments available on the market, which can be used for the inspection and cleaning of pipelines, commonly known as "pigs" ("Pipeline Inspection Gauges").

These "pigs" are generally equipped with complex instruments and detection systems capable of providing various types of information.

The following instruments are known, for example: (a) "caliper pigs", used for obtaining details of the profile of the internal wall including the ovalization and for detecting geometrical/mechanical defects; (b) "Magnetic Flux Leakage (MFL) pigs" and "Ultrasonic Test (UT) pigs" used for detecting defects of the metal loss type; (c) pigs for revealing fissures; (d) pigs for revealing leaks and/or cracks; (e) pigs equipped with GSM and inertial devices used for revealing the geometrical characteristics of the layout of the line.

These "pigs" are generally equipped with an instrumentation comprising sensors, electronic controls, motors, battery containers. This instrumentation is generally contained in casings made of metal or rigid plastic.

The dimensions of these "pigs" change in relation to the conditions of use, the operative autonomy, the number of sensors present, and in any case remain over a meter in length also for smaller configurations.

These "pigs" are generally extremely useful in the case of pipelines subjected to regular inspections and in which no unexpected blockages are present.

As they are rather invasive systems, in the case of excessive deposits or restrictions in the pipelines, the use of these "pigs" can cause dangerous jams inside the pipelines.

Consequently, if the conditions of the pipelines are not known a priori, or in the case of interventions which must be urgently effected, less invasive techniques are preferred. In this respect, it is known the use of inspection instruments, which are made of expanded polymeric or elastomeric material, known to experts in the field as "foam pigs" or "poly pigs". These terms will be used hereunder as synonyms.

After being introduced into the pipelines, "foam pigs" are generally transported by the liquid and/or gas flow which normally passes through said pipelines.

Generally, these "foam pigs" have a diameter which is such as to ensure contact between their side walls and the internal walls of the pipelines into which they have been introduced, thus allowing them to advance together with the liquid and/or gas flow which is passing through said pipelines.

From a careful analysis of the "foam pig" conditions at the end of the inspection, it is possible to establish some information on the state of the pipelines.

The information collected, however, is limited and inadequate, in particular, with respect to possible restrictions present in the pipelines.

Said "foam pigs" are generally used as a first step in the inspection program of pipelines as, due to the fact that they are not particularly invasive, they represent a practically zero risk activity.

These "foam pigs" however are not capable of removing solid deposits which can be present in the pipelines, as the expanded polymeric or elastomeric material of which they are made is compressed in the presence of restrictions which can be caused by the accumulation of said solid deposits in the pipelines.

Consequently, in order to remove these solid deposits, various launches of the "foam pigs" must be effected inside the pipelines, gradually increasing the density and/or diameter of the same.

In the case of the presence of larger restrictions or wedging of the "foam pigs" in the pipelines, there is no complete obstruction of the same as the increase in the pressure of the liquid or gas on the surface of the "foam pigs" causes their destruction.

It is also known that, in order to be able to obtain further information on the conditions of the pipelines, said "foam pigs" can be equipped with sensors capable of detecting, for example, pressure, temperature, acceleration, and therefore providing useful information relating to deposits of solid materials inside the pipelines, or other characteristics inside the pipelines (e.g. the presence of fissures, leaks and/or cracks).

The U.S. Pat. No. 5,659,142, for example, describes a process for acquiring data relating to physical parameters for the whole length of a pipeline which comprises passing through a pipeline with a "pig" equipped with a pressure sensor in its interior and continuously measuring and registering the parameters relating to the pressure for the whole length of the pipeline, wherein the body of the "pig" is made of a expanded polymeric or elastomeric material having a density lower than 40 kg/m$^3$ capable of allowing the "pig" to pass through restrictions of the diameter of the pipeline. The above process is capable of providing information relating to the presence of scattered or extensive blockages along the pipeline.

The process described in the above patent, however, can create various risks, in particular in the case of a possible breakage of the "foam pig" and consequent release of the sensor contained therein in the pipeline. Furthermore, this process does not allow a complete analysis on the state of the pipeline and on the variations in its diameter, as it envisages the use of only one pressure sensor.

International patent application WO 2006/081671 describes an instrument equipped with sensors useful for revealing the conditions of a pipeline comprising: a casing (e.g. a casing made of a rigid material such as, for example, rigid plastic or metal) containing a sensor selected from at least a magnetic sensor and at least an acceleration sensor, and means for registering the data revealed by said sensor. This instrument has a spherical form and allows the state of the pipeline to be revealed by rolling in the same, transported by the flow of liquid present therein. The casing containing the sensor is preferably coated with an easily compressible expanded material, for example open-cell or cross-linked low-density expanded polyurethane. This instrument has a total dimension lower than the internal diameter of the pipeline, so that it can easily roll over obstacles present in the same, without becoming wedged.

The use of this instrument however does not allow any information relating to possible restrictions of the pipeline to be obtained from the data registered, in particular from the pressure data.

Furthermore, the processes indicated above can have other drawbacks. The possible breakage of the "foam pig", for example, or of the instrument equipped with sensors, particularly when the sensors are contained in metallic casings, could cause a dispersion of voluminous and rigid parts in the pipeline jeopardizing further inspection operations and creating the risk of damage to the same. Recovery operations could therefore be necessary, which are not only costly but could also create operative risks.

The Applicant has consequently considered the problem of finding a method for the monitoring and analysis of the conditions of a pipeline capable of providing reliable data in relation to the conditions of the same and overcoming the drawbacks described above.

The Applicant has now found that the use of an inspection instrument made of expanded polymeric or elastomeric material comprising at least one measurement instrument including at least one casing and at least one sensor, said casing being made of a polymeric or elastomeric material having a particular density, is capable of overcoming the drawbacks indicated above.

More specifically, the Applicant has found that the presence of said casing, in the case of damage or breakage of the inspection device:
  does not negatively influence the functioning of the pipeline;
  does not jeopardize subsequent inspection operations of the pipeline;
  avoids recovery operations of the measuring instruments dispersed in the pipeline.

Furthermore, said measurement instrument allows to continuously register and store parameters useful for revealing defects and/or anomalies inside the pipeline.

An object of the present invention therefore relates to a monitoring and analysis method of the conditions of a pipeline, comprising:
  providing an inspection device in expanded polymeric or elastomeric material comprising at least one measurement instrument, said measurement instrument including at least one casing and at least one sensor;
  introducing said inspection device into the pipeline;
  recovering said inspection device;

wherein said casing is made of polymeric or elastomeric material, having a density, measured according to the regulation ASTM D3574, higher than or equal to 30 kg/m$^3$, preferably ranging from 700 to 2,000 kg/m$^3$.

For the purposes of the present invention and following claims, the definitions of the numerical ranges always comprise the extremes unless otherwise specified.

According to a preferred embodiment of the present invention, said pipeline can transport gas and/or liquids.

In order to avoid impediments in the pipeline in the case of breakage of said inspection device, it is advantageous to use measurement instruments having reduced dimensions.

According to a preferred embodiment of the present invention, the largest dimension of said measurement instrument can be lower than or equal to 60 mm, preferably ranging from 25 mm to 51 mm.

It should be pointed out that the dimensions of said measurement instrument are in any case lower than the dimensions of the inspection device which comprises it.

According to another preferred embodiment of the present invention, said measurement instrument can have a density ranging from 0.8 times to 1.2 times the average density of the liquid transported in the pipeline.

According to a further preferred embodiment of the present invention, said measurement instrument can be isodense with respect to the liquid transported in the pipeline.

It should be pointed out that the fact of being isodense with respect to the liquid transported in the pipeline, allows said measurement instrument to be transported more easily to the recovery point (i.e. interception station).

It should be noted that, if the pipeline is transporting liquid with an average density lower than the density of the measurement instrument, the volume of the casing of said measurement instrument can be increased to reduce the overall density of the measurement instrument, the volume can preferably be increased until it is the same as the average density of the liquid. Alternatively, if the pipeline is transporting liquid with an average density higher than the density of the measurement instrument, the volume of the casing of the measurement instrument can be increased and material having a specific weight higher than that of the measurement instrument can be introduced into the same, so as to increase the overall density of the measurement instrument, the overall density of the instrument can preferably be increased until it is the same as the average density of the liquid.

It should also be pointed out that, for the purposes of the present invention, the density and diameter of said inspection device are such as to guarantee an interaction between the inspection device and the internal walls of the pipeline.

According to a preferred embodiment of the present invention, said expanded polymeric or elastomeric material can have a density, measured according to the standard ASTM D3574, higher than or equal to 20 kg/m$^3$, preferably ranging from 25 kg/m$^3$ to 150 kg/m$^3$.

It should be noted that, for the purposes of the present invention, said expanded polymeric or elastomeric material can comprise two layers, the outer layer being made of expanded polymeric or elastomeric material having a density greater than the expanded polymeric or elastomeric material of the internal layer. It should also be noted that the average overall density of the two polymeric materials, measured according to the standard ASTM D3574, is included in the values indicated above.

According to a preferred embodiment of the present invention, said expanded polymeric or elastomeric material of said inspection device can be selected from polyurethanes, polyethylenes, polystyrenes, polyesters or mixtures thereof. Polyurethanes are preferred.

According to a preferred embodiment of the present invention, said polymeric or elastomeric material of said casing can be selected from polyurethanes, polyethylenes polystyrenes, polyesters, acetals or mixtures thereof. Polyurethanes are preferred.

It should be pointed out that, in the case of breakage of said inspection device, said polymeric or elastomeric material of said casing, when entering into contact with the liquid transported in the pipeline, in particular in the case of oil, can be subject to dissolution, depolymerization or disgregation. Preferably, said polymeric or elastomeric material of said casing can be subject to dissolution, depolymerization or disgregation, within a period less than or equal to 6 months, more preferably less than or equal to 1 month.

For the purposes of the present invention, said measurement instrument can be inserted in suitable spaces situated in the body of the inspection device. According to a preferred embodiment of the present invention, said sensor can be selected from: pressure sensors, temperature sensors, acceleration sensors, image sensors equipped with illumination systems, or combinations thereof.

Said acceleration sensors are preferably three-axis acceleration sensors.

It should be pointed out that said image sensors can register video information on the internal conditions of the pipeline.

According to a further preferred embodiment of the present invention, said inspection device comprises at least two measurement instruments, preferably two measurement instruments including pressure sensors, said measurement instruments being positioned on the surfaces of said inspection device which are not in contact with the internal walls of the pipeline and which are opposite to each other.

It should be pointed out that the particular positioning of the two measurement instruments indicated above allows the difference in the values revealed between the front and back of the inspection device to be measured, allowing to determine more reliably the variations in the diameter of the pipeline due to both deposits of solid materials and deformations of the same.

It should be noted that said inspection device, thanks to the measurement instrument(s) contained therein, is capable of measuring and memorizing important data relating to its interaction with the internal walls of the pipeline during its movement inside the same.

If said inspection device is equipped with an acceleration sensor, the data recovered by said acceleration measurement instrument can be combined with the information relating to the flow-rate and velocity of the fluid flowing in the pipeline.

According to a further preferred embodiment of the present invention, said measurement instrument can comprise at least one energy source and at least one data storage means.

According to another preferred embodiment of the present invention, said data storage means can communicate with said measuring sensor(s) by means of wireless communication.

It should be pointed out that said measurement instrument can be installed in the inspection device in very short times and directly on the inspection site.

According to another preferred embodiment of the present invention, said measurement instrument can be equipped with at least one anchoring system to said inspection device in order to avoid the dispersion of the same inside the pipeline should it exit from the housings present in said inspection device.

The introduction of said inspection device into the pipeline can be effected according to procedures known in the art. Once it has been introduced into the pipeline, the inspection device moves along the pipeline pushed by the liquid and/or gas which is flowing in the same.

It should be pointed out that the transporting of said inspection device does not cause any interruption in the passage of the fluid inside the pipeline.

At the end of the inspection, said inspection device is recovered by means of an interception station produced so as to capture said inspection device and/or the measurement instrument(s) contained therein, avoiding interruption of the flow of liquid inside the pipeline.

According to another preferred embodiment of the present invention, said interception station can comprise at least one reception trap, for example, a grid with bars equidistant and at a lesser distance than the lower dimension of the isodense measurement instrument. In particular, said reception trap may be positioned inside the pipeline, preferably in correspondence with a branching of the same.

According to a further preferred embodiment of the present invention, after being recovered, the data stored in said measurement instrument(s) can be downloaded into a data analysis centre, for example, into a personal computer having a program capable of processing the data obtained.

The data can preferably be discharged from the measurement instrument(s) by means of electric contacts present in the measurement instrument(s), or through a wireless communication system.

Said measurement instrument can be eliminated after the inspection and analysis of the data, or it can be re-used after a reconfiguration of the same.

It should be pointed out that the information recovered from the measurement instrument(s) can also be associated with other information known a priori such as, for example:
- a passage in correspondence with the valves present along the pipeline;
- a passage in the sectional structural reductions of the pipeline;
- a passage in correspondence with the weldings of the various modules of the pipeline;
- a passage in pipelines produced with different materials.

By using this information and analyzing the data obtained from the measurement instrument(s), it is possible to identify the variations in the diameter along the pipeline, or the presence of fissures, leaks and/or cracks along the pipeline, and consequently evaluate the necessity of possible maintenance interventions on the same.

A further object of the present invention relates to an inspection device made of an expanded polymeric or elastomeric material comprising at least one measurement instrument, said measurement instrument including at least one casing and at least one sensor, said casing being in polymeric or elastomeric material having a density, measured according to the regulation ASTM D3574, higher than or equal to 30 kg/m$^3$, preferably ranging from 700 to 2,000 kg/m$^3$.

Figure 2:
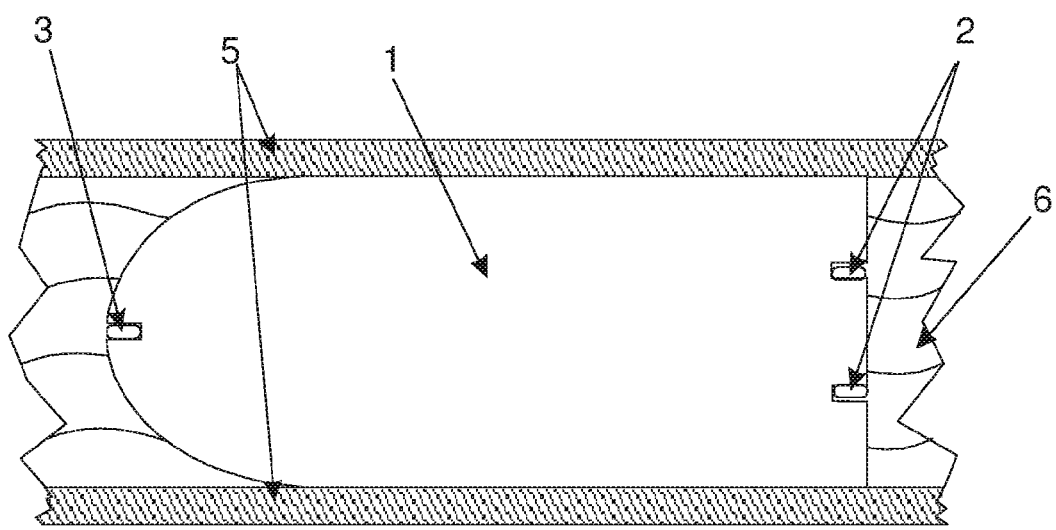
Figure 3:
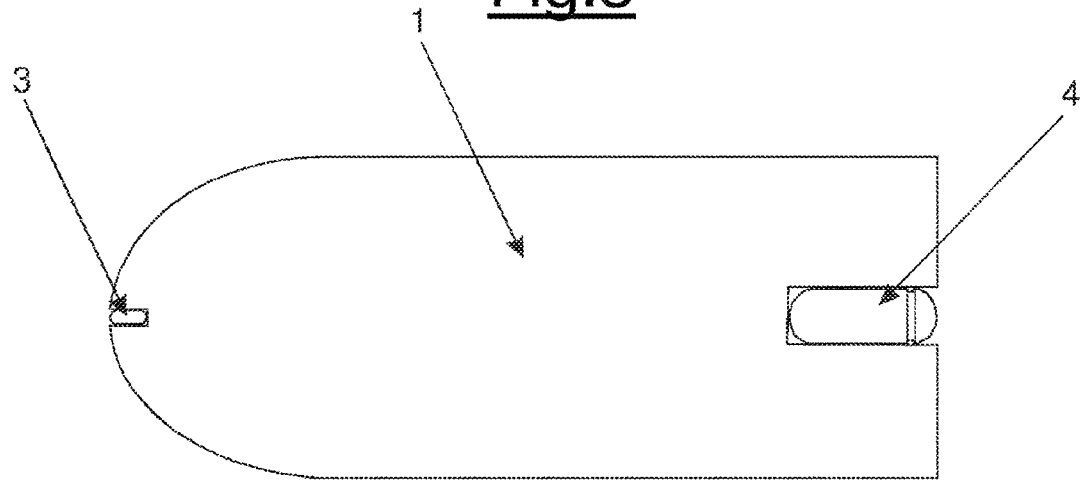
Figure 4:
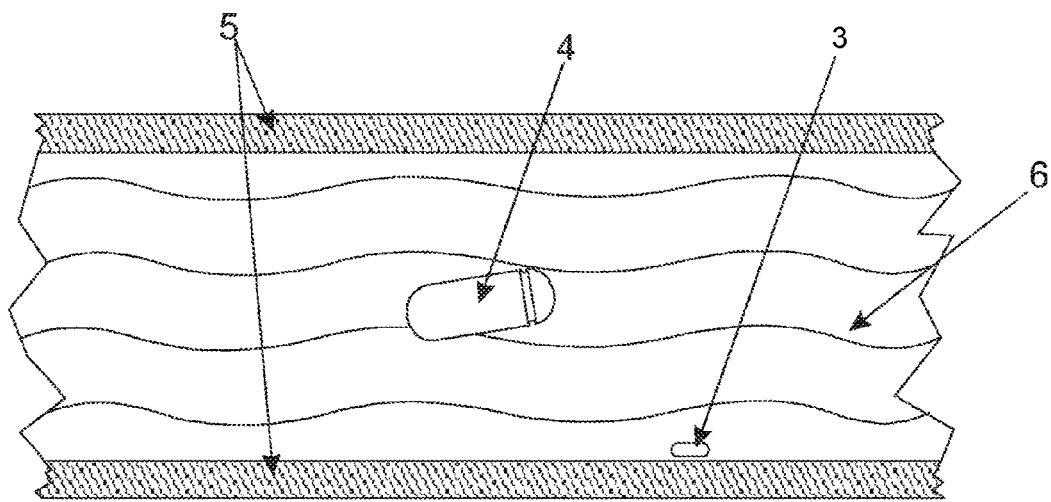
Figure 5:
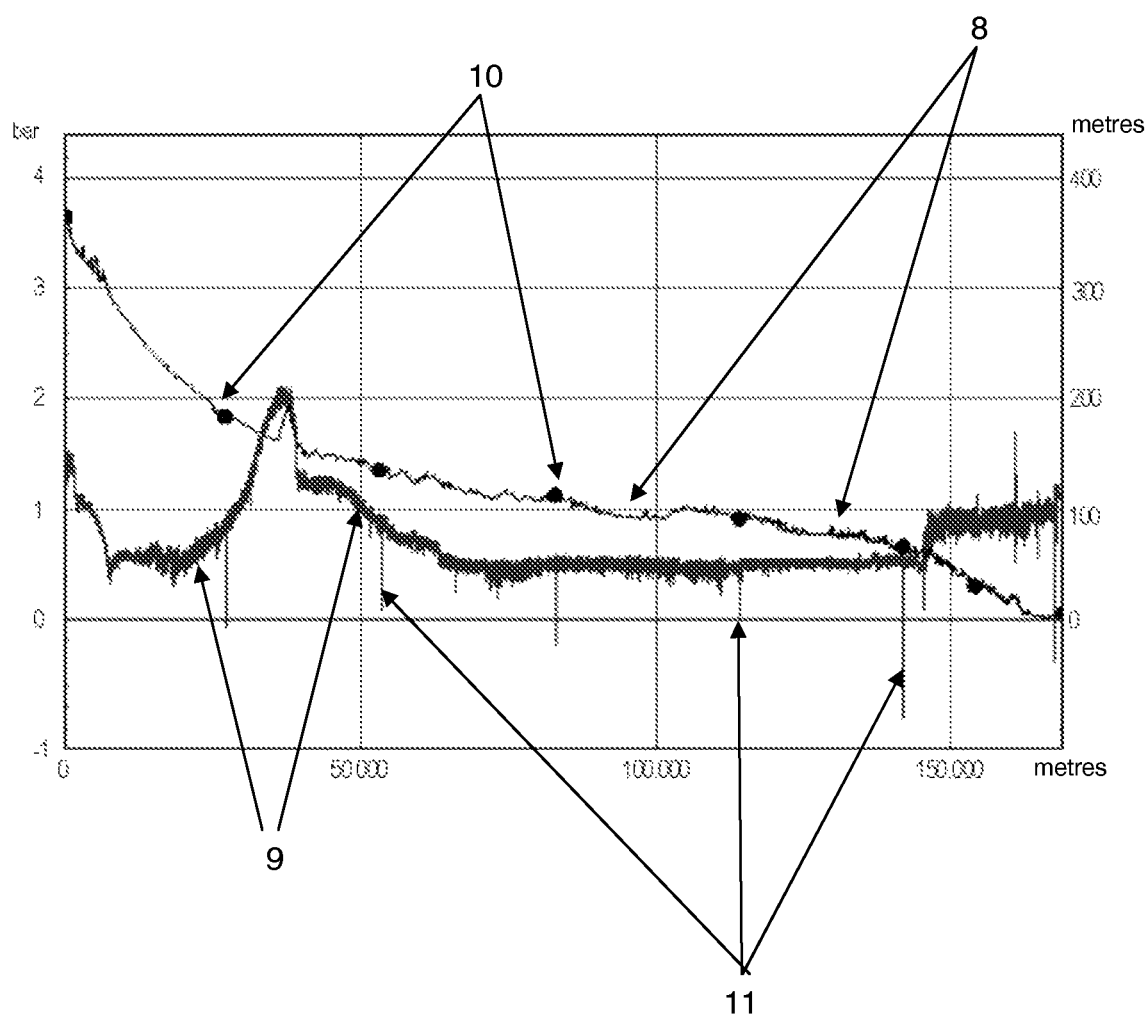

Further characteristics and advantages of the inspection device used in the method of the present invention will appear more evident from the following description of various embodiments, provided for illustrative and non-limiting purposes, with reference to FIGS. 1-6 provided hereunder, wherein:

FIG. 1: represents a schematic illustration of an embodiment of the inspection device according to the present invention;

FIG. 2: represents a schematic illustration of a form of use of the inspection device according to the present invention;

FIG. 3: represents a schematic illustration of a further embodiment of the inspection device according to the present invention;

FIG. 4: represents a schematic illustration of various measurement instruments dispersed in the pipeline following breakage of the inspection device;

FIG. 5: represents an illustrative graph of the results deriving from the inspection of a pipeline actuated according to the present invention;

FIG. 6.1: represents a possible configuration of the interception station for the recovery of the inspection device;

FIG. 6.2: represents a possible configuration of the interception station for the recovery of possible isodense measurement instruments dispersed in the pipeline.

With reference to FIG. 1, the inspection device (1) made of expanded polymeric or elastomeric material (e.g. expanded polyurethane) comprises two measurement instruments (2) positioned at one side of said inspection device (1) and two measurement instruments (3) positioned at the opposite side of said inspection device (1).

FIG. 2 represents a form of use of the inspection device (1) according to the present invention. An inspection device (1) equipped with measurement instruments (2) and (3) was introduced inside a pipeline (5). Said inspection device (1) moves in the pipeline (5) through which the fluid (6) flows.

FIG. 3 represents a further embodiment of the inspection device (1) according to the present invention, in which there are two measurement instruments different from each other in dimension and characteristics. The measurement instrument (4) is more voluminous than the measurement instrument (3) as it is isodense with respect to the liquid conveyed by the pipeline.

FIG. 4 shows the isodense measurement instrument (4) with respect to the liquid (6) conveyed in the pipeline (5) and the measurement instrument (3) dispersed in the pipeline (5) following breakage of the inspection device. In particular, the isodense measurement instrument (4) is transported by the liquid (6) conveyed in the pipeline (5), whereas the measurement instrument (3) remains on the bottom.

FIG. 6.1 represents a possible interception station (10) consisting of a reception trap (11) capable of capturing the inspection device (1).

By positioning the grids (12) in correspondence with the branchings of the pipeline, the inspection device (1) cannot continue its trajectory in the pipeline and is forced to enter the reception trap (11) without preventing the passage of the flow of liquid or gas in the pipeline through the grids (12 bis).

The interception station (10) as represented is situated in a derivation of the main pipeline in which, by closing the valve (13), the flow of the pipeline is forced to pass into the reception trap (11) and then through the open valve (14).

FIG. 6.2 illustrates how the interception station (10) is capable of also capturing possible isodense measurement instruments (4) transported by the liquid which is flowing in the pipeline following breakage of the inspection device. In fact, said measurement instrument (4) having a larger dimension with respect to the distance between the bars of the grids (12 bis), remains blocked in the reception trap (11).

An illustrative and non-limiting example of the present invention is provided hereunder for a better understanding of the same and for its embodiment.

Example 1

An inspection device according to FIG. 1 was used for the purpose.

An inspection device (1) having a diameter of 16 inches produced with two layers of polyurethane, an internal layer having a density, measured according to the standard ASTM D3574, equal to 80 kg/m$^3$ and the other outer, having a density, measured according to the standard ASTM D3574, equal to 130 kg/m$^3$.

Said outer layer having a greater density, allows a better friction with the internal walls of the pipeline (5).

Said pipeline has an internal diameter equal ○16 inches, a length of 170 km and is positioned on mainland.

Said inspection device was also equipped with two measurement instruments of the pressure opposite each other, an acceleration measurement instrument, a temperature measurement instrument, having casings made of polyurethane with a density equal to 1,900 kg/m$^3$.

An interception station (10) (as represented in FIG. 6.1) was used for recovering the inspection device introduced into the pipeline, equipped with two steel grids (12) having a barred structure, in which each bar is at a distance of about 25 millimetres from the other and wherein said interception station (10) is situated in a derivation of the pipeline (see FIG. 6.1).

The data collected by the measurement instruments were then organized by software installed on a personal computer and graphically represented in FIG. 5.

The graph of FIG. 5 shows, in the abscissa, the distance expressed in metres and, in the ordinate, the pressure difference in bar, in addition to the altimetry of the pipeline expressed in metres.

The graph of FIG. 5 shows the altimetric profile of the pipeline expressed in metres in relation to the distance of the pipeline from the origin expressed in metres (8) and the pressure difference expressed in bar measured between the rear sensor and the front sensor of the inspection device in relation to the distance covered by the device inside the pipeline (9).

From the graph of FIG. 5, a large amount of information revealed by the inspection device can be read, for example, the interception valves shown with dots (10) on the altimetric curve (8), can also be easily observed on the pressure difference curve (9), which has brusque peaks (11) in correspondence with the same valves.

Furthermore, at a distance of 140,000 m approximately, a step can be observed in the graph of the pressure difference (9), this reveals a change in the internal diameter of the pipeline from 382.6 mm (before) to 371.4 mm (after).

Finally, the trend of the pressure difference curve (9) between 0 and 70,000 m shows that deposits are present inside the pipeline.

The invention claime is:

1. A monitoring and analysis method of the conditions of a pipeline, comprising:
   providing an inspection device of expanded polymeric or elastomeric material comprising at least one measurement instrument, said measurement instrument including at least one casing and at least one sensor;
   introducing said inspection device into the pipeline; and
   recovering said inspection device;
   wherein said casing is made of polymeric or elastomeric material, having a density higher than or equal to 30kg/m$^3$ and wherein said measurement instrument has an overall density ranging from 0.8times to 1.2times the average density of liquid conveyed in the pipeline.

2. The monitoring and analysis method of the conditions of a pipeline according to claim 1, wherein said polymeric or elastomeric material of said casing of said measurement instrument has a density ranging from 700kg/m$^3$ to 2,000kg/m$^3$.

3. The monitoring and analysis method of the conditions of a pipeline according to claim 1, wherein said pipeline conveys gases and/or liquids.

4. The monitoring and analysis method of the conditions of a pipeline according to claim 1, wherein a larger dimension of said measurement instrument is lower than or equal to 60mm.

5. The monitoring and analysis method of the conditions of a pipeline according to claim 1, wherein in said inspection device said expanded polymeric or elastomeric material has a density ranging from $25kg/m^3$ to $150kg/m^3$.

6. The monitoring and analysis method of the conditions of a pipeline according to claim 1, wherein said expanded polymeric or elastomeric material of said inspection device is selected from polyurethanes, polyethylenes, polystyrenes, polyesters or mixtures thereof.

7. The monitoring and analysis method of the conditions of a pipeline according to claim 1, wherein said polymeric or elastomeric material of said casing of the measurement instrument is selected from polyurethanes, polyethylenes polystyrenes, polyesters, acetals or mixtures thereof.

8. The monitoring and analysis method of the conditions of a pipeline according to claim 1, wherein said sensor of said measurement instrument is selected from:
   pressure sensors,
   temperature sensors,
   acceleration sensors,
   image sensors equipped with illumination systems,
   or combinations thereof.

9. The monitoring and analysis method of the conditions of a pipeline according to claim 1, wherein said inspection device comprises at least two measurement instruments, positioned on the surfaces of said inspection device which are not in contact with the internal walls of the pipeline and which are opposite of each other.

10. The monitoring and analysis method of the conditions of a pipeline according to claim 1, wherein said measurement instrument comprises at least one energy source and at least one data storage means.

11. The monitoring and analysis method of the conditions of a pipeline according to claim 1, wherein said measurement instrument is equipped with at least one anchoring system to said inspection device.

12. The monitoring and analysis method of the conditions of a pipeline according to claim 1, wherein said inspection device is recovered by means of an interception station.

13. The monitoring and analysis method of the conditions of a pipeline according to claim 1, wherein, after recovering said inspection device, data stored in a data storage means is discharged into a data analysis centre capable of processing them.

14. An inspection device for pipelines made of expanded polymeric or elastomeric material comprising at least one measurement instrument including at least one casing and at least one sensor characterized in that said casing is in polymeric or elastomeric material having a density higher than or equal to $30kg/m^3$, wherein said measurement instrument has an overall density ranging from 0.8times to 1.2times the average density of liquid conveyed in the pipelines.

15. The inspection device for pipelines according to claim 14, wherein said polymeric or elastomeric material of said casing has a density ranging from 700to 2,000kg/m3.

16. The inspection device for pipelines according to claim 14, wherein a larger dimension of said measurement instrument is lower than or equal to 60mm.

17. The inspection device for pipelines according to claim 14, wherein said expanded polymeric or elastomeric material of said inspection device has a density higher than or equal to $20kg/m^3$.

18. The inspection device for pipelines according to claim 14, wherein said expanded polymeric or elastomeric material of said inspection device is selected from polyurethanes, polyethylenes, polystyrenes, polyesters, or mixtures thereof.

19. The inspection device for pipelines according to claim 14, wherein said polymeric or elastomeric material of said casing of the measurement instrument is selected from polyurethanes, polyethylenes, polystyrenes, polyesters, acetals or mixtures thereof.

20. The inspection device for pipelines according to claim 14, wherein said sensor of said measurement instrument is selected from:
   pressure sensors,
   temperature sensors,
   acceleration sensors,
   image sensors, equipped with illumination systems,
   or combinations thereof.

* * * * *

UNITED STATES PATENT AND TRADEMARK OFFICE
CERTIFICATE OF CORRECTION

PATENT NO. : 9,188,270 B2  Page 1 of 1
APPLICATION NO. : 13/809998
DATED : November 17, 2015
INVENTOR(S) : Alberto Giulio Di Lullo et al.

It is certified that error appears in the above-identified patent and that said Letters Patent is hereby corrected as shown below:

In the claims
Column 10, claim 15, line 18, "2,000kg/m3" should read --2,000 kg/m$^3$--

Signed and Sealed this
Sixteenth Day of February, 2016

Michelle K. Lee
*Director of the United States Patent and Trademark Office*